United States Patent

Kho

[11] Patent Number: 5,506,717
[45] Date of Patent: Apr. 9, 1996

[54] APPARATUS FOR LOCATING A REMOTE CONTROL TRANSMITTER

[75] Inventor: Bong S. Kho, Seoul, Rep. of Korea

[73] Assignee: Goldstar Co., Ltd., Seoul, Rep. of Korea

[21] Appl. No.: 202,542

[22] Filed: Feb. 28, 1994

[30] Foreign Application Priority Data

Mar. 3, 1993 [KR] Rep. of Korea ................. 1993-3084

[51] Int. Cl.⁶ .................................................. H04B 10/00
[52] U.S. Cl. ...................... 359/155; 359/159; 359/142; 340/825.49
[58] Field of Search ..................... 359/155, 159, 359/142; 340/539, 573, 825.36, 825.49, 531, 600, 568; 455/92, 352

[56] References Cited

U.S. PATENT DOCUMENTS

| | | | |
|---|---|---|---|
| 3,665,313 | 5/1972 | Trent | 340/825.49 |
| 3,704,070 | 11/1972 | Johnson et al. | 359/155 |
| 3,764,213 | 10/1973 | O'Meara | 359/155 |
| 4,044,250 | 8/1977 | Fetzer | 359/155 |
| 4,097,806 | 6/1978 | Evans | 375/13 |
| 4,101,873 | 7/1978 | Anderson et al. | 340/539 |
| 4,476,469 | 10/1984 | Lander | 340/825.49 |
| 5,009,501 | 4/1991 | Fenner et al. | 356/152 |
| 5,266,807 | 11/1993 | Neiger | 340/573 |
| 5,274,359 | 12/1993 | Adams | 340/539 |
| 5,276,428 | 1/1994 | Cadossi et al. | 340/573 |

FOREIGN PATENT DOCUMENTS

| | | | |
|---|---|---|---|
| 9117634 | 11/1991 | European Pat. Off. | 340/825.49 |
| 0132234 | 5/1989 | Japan | 359/155 |

OTHER PUBLICATIONS

Millman and Halkias, "Integrated Electronics: Analog and Digital Circuits and Systems", McGraw–Hill Book Company.

Primary Examiner—Leo Boudreau
Assistant Examiner—Bhavesh Mehta

[57] ABSTRACT

An apparatus for locating a remote control transmitter which controls an electronic or electric device, such as a TV, VCR, or air conditioner. The apparatus includes two detecting units disposed at different angles, and the different infrared signal strengths received according to directivity of the location detecting units is transformed into a time value from which the accurate location of the remote control transmitter can be obtained. The apparatus is simple and the detecting operation of the remote control transmitter is reliable and precise.

12 Claims, 3 Drawing Sheets

FIG. 4
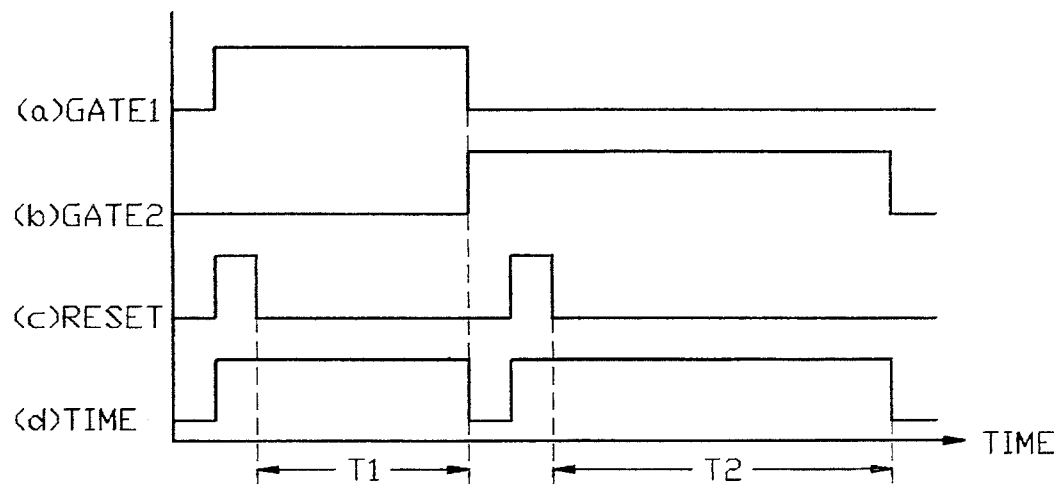
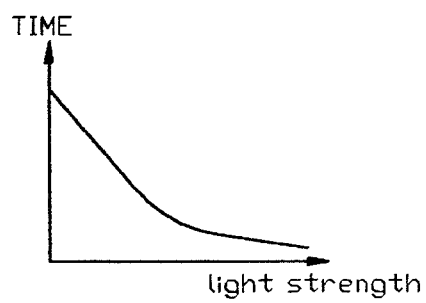
FIG. 5(a)
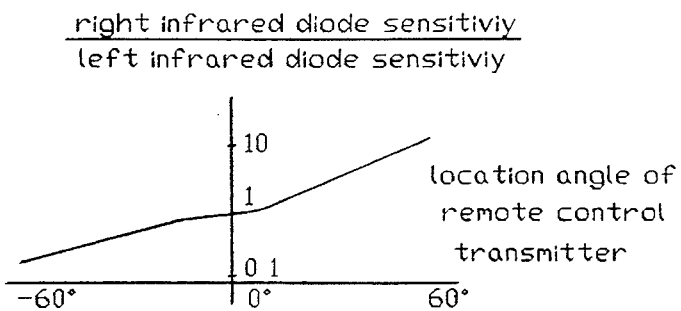
FIG. 5(b)
FIG. 5(c)
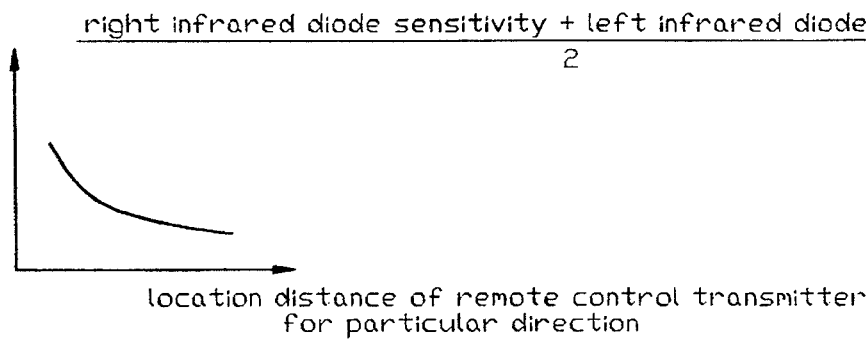

APPARATUS FOR LOCATING A REMOTE CONTROL TRANSMITTER

BACKGROUND OF THE INVENTION

The present invention relates to an apparatus for locating a remote control transmitter to locate a remote control transmitter which is intended for controlling an electronic or electric device such as TV, VCR, or air conditioner.

FIG. 1 shows a conventional apparatus for locating a remote control transmitter, which comprises a plurality of infrared diodes 2 whose sensing area is divided separately at a uniform angle due to the shape of an infrared guide 1, a plurality of amplifiers 3 for amplifying the signal sensed by infrared diodes 2 respectively, a switch circuit 4 to output the amplified signal sequentially and selectively by a control signal CTL, a filtering circuit 5 for filtering the signal selected from said switch circuit 4, a rectifying circuit 6 for rectifying said filtered signal, and a comparing circuit 7 to output a location detecting signal after said rectified signal is compared with a reference signal.

In the operation of the conventional apparatus the infrared signal emitted from a remote control transmitter is received by the infrared diodes 2. And said infrared signal is received concentrically by the infrared diodes disposed in the particular direction among a plurality of infrared diodes by the infrared guide 1.

Further, said received infrared signal is amplified by the amplifier 3 and input to the switch circuit 4, which selects a plurality of outputs of the amplifier 3 sequentially by the control signal CTL and supplies them to the filtering circuit 5.

Then, the filtering circuit 5 removes noise from the selected output of the amplifier and supplies it to the rectifying circuit 6, which rectifies the input signal and supplies it to the comparing circuit 7.

Finally, the comparing circuit 7 compares the level of the input infrared signal sensed from one selected particular infrared diode with a prescribed reference value, outputs the compared result as a high or low signal, and detects the location of the remote control transmitter according to the high or low signal by interpreting which infrared diode sensed the infrared rays.

That is, the infrared guide 1 limits the receiving route of the adjacent infrared diodes 2, which can receive the infrared signal of the remote control transmitter in the particular direction. As a result of comparing the received signals the location of the remote control transmitter is detected.

However, the aforementioned conventional apparatus for locating remote control transmitter has the following problems. Since the infrared guide for dividing the respective sensing areas, requires a plurality of infrared diodes disposed at the respective sensing areas between the guides, and a same number of amplifiers for each receiving signals are required, the circuit becomes complicated. In order to realize the exact analysis of the distance information from the remote control transmitters a separate analog-to-digital converter is required so that the circuit becomes more complicated, Accordingly, the locating operation of the remote control transmitter also becomes unreliable.

SUMMARY OF THE INVENTION

The object of the present invention is to provide an apparatus for locating remote control transmitter which includes one or more location detecting units disposed at different angles, and the infrared signal strength received differently according to directivity of the location detecting units is transformed into a time value from which the accurate location of the remote control transmitter can be obtained. Therefore, the circuit becomes simple and the detecting operation of the remote control transmitter is reliable and precise.

In order to achieve the aforementioned object, the apparatus for locating remote control transmitter comprises one or more location detecting units disposed in the prescribed direction with directivity for receiving infrared signals from the remote control transmitter, one or more amplifying circuits for amplifying the signals received at each location detecting unit, one or more switch circuits to output the amplified signals during a prescribed time according to gate signals, means for adding the signal output from the switch circuits, a main amplifier for amplifying the added signal to a necessary and desirable level of location detection, a rectifying circuit for rectifying the amplified signal, an integrating circuit for integrating the rectified signal during a predetermined time and for converting the signal strength received at the respective location detecting units into a corresponding time information, and a comparing circuit for comparing the integrated signal with a prescribed reference value and transforming it into the time information corresponding to the signal strength received at the location detecting units.

BRIEF DESCRIPTION OF THE DRAWINGS

FIG. 4 shows operation wave forms of the apparatus for locating a remote control transmitter according to the present invention;

FIGS. 5(a), 5(b), and 5(c) are characteristic graphs of the apparatus for locating a remote control transmitter according to the present invention.

DETAILED DESCRIPTION OF THE INVENTION

Figure 1:
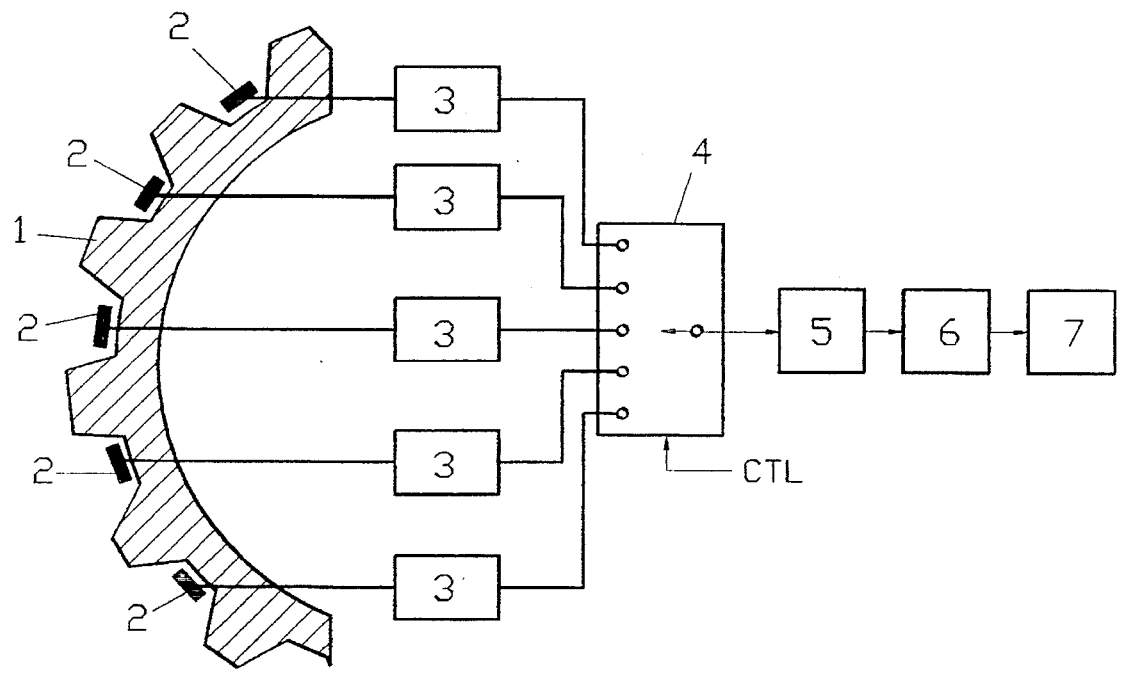
FIG. 1 is a schematic diagram of the conventional apparatus for locating a remote control transmitter.
Figure 2:
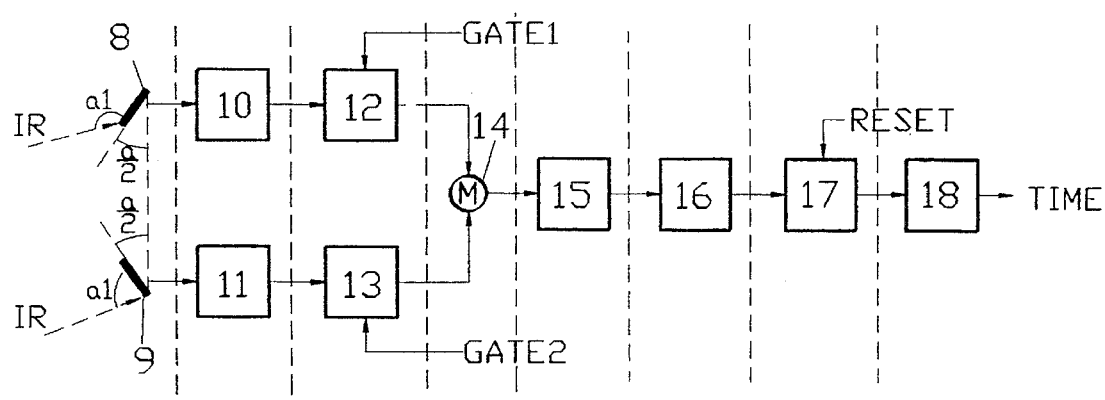
FIG. 2 is a block diagram of the apparatus for locating a remote control transmitter according to the present invention.

Referring to FIG. 2, the infrared rays (hereinafter referred as IR) emitted from a remote control transmitter are incident at a prescribed incidence angle a1 upon two location detecting units 8 and 9, which are disposed in the particular direction with each other having a prescribed angle a/2, further and the location detecting unit itself has a directivity for a particular direction.

As a result, the receiving sensitivity is changeable according to the incidence angle of the receiving signal which is incident upon each location detecting unit.

The directivity of the location detecting units 8 and 9 causes a high receiving sensitivity for the infrared signal which is incident upon the detecting unit perpendicularly and has a lowering receiving sensitivity according to a deviation from the perpendicular direction.

The location detecting units of the present invention 8 and 9 are disposed right and left side from the front of the incident direction with an angle of a/2 and each location detecting units 8 and 9 have different receiving sensitivities for the same IR.

The sensitivity of the respective location detecting units 8 and 9 which is variable according to the distance and angle of the remote control transmitter, can be found as shown in FIGS. 5(*b*) and 5(*c*) by observing the characteristics through the specification table or experiment of the location detecting units 8 and 9.

Since the location detecting units 8 and 9 receive the IR emitted from one signal source with different sensitivities as shown in the characteristic graphs, the location of the remote control transmitter can be detected by interpreting the level of the signal received at each location detecting units 8 and 9 reversely.

Accordingly, in proportion to the signal strength (amplitude) received at the respective location detecting units 8 and 9, the strength is transformed into a time information by the receiving sensitivity characteristics of the location detecting units 8 and 9, and the location of the remote control transmitter is detected by interpreting the time information.

The infrared signals received at the location detecting units 8 and 9 are amplified by the respective amplifying circuits 10 and 11. This is because the infrared signal emitted from the remote control transmitter is an AC signal with a prescribed frequency, the signal has to be amplified to the sufficient level at an initial step.

Said amplified infrared signals are input to the respective switch circuits 12 and 13, which are continued during a prescribed time by gate signals GATE 1, and GATE 2 shown in FIGS. 4(*a*) and 4(*b*), and send the amplified infrared signals to a variable resistor 14.

The infrared signals supplied to the variable resistor 14 are amplified by a main amplifier 15 to the necessary and desirable level to locate the remote control transmitter, that is, the prescribed level required for the following steps such as rectification, integration and comparing disposition, and supplied to a rectifying circuit 16.

The rectifying circuit 16 rectify the amplified signal which is an AC signal into half wave and supply it to an integrating circuit 17, which integrates the input signal after initialization by inputting a reset signal (hereinafter referred as RESET) at initial stage of the integration as shown in FIG. 4(*c*), The integration is carried out during a prescribed time and the level of the integral signal is in proportion to the signal strength received at the location detecting units 8 and 9 as shown in FIGS. 5(*a*).

The integrated signal is supplied to a comparing circuit 18. Said comparing circuit 18 compares the integrated signal with a prescribed reference value, measures a time for which the level of the integrated signal reaches the reference value, and outputs a time information (hereinafter referred as TIME) shown in FIGS. 4(*d*).

In the operation of interpretation of the receiving sensitivity of the each location detecting units 8 and 9, the input signal is amplified, rectified into half wave, integrated, and the time for which the level of the integrated signal reaches the reference value is measured, so that the receiving sensitivities (amplitude) of the respective location detecting parts 8 and 9 can be transformed into the time information, The time information is a value which corresponds to the receiving level of the location detecting units 8 and 9, and the location of the remote control transmitter is obtained from the time values T1 and T2. T1 is a time value which is obtained by integrating the signal received at the location detecting unit 8 during the time when the power of the switch circuit 12 is on state by the GATE1 until the reference value is reached, and T2 is a time value which is obtained by integrating the signal received at the location detecting unit 9 during the time when the power of the switch circuit 13 is on state by GATE2 until the reference value is reached.

The time values T1 and T2 are in inverse proportion to the receiving sensitivity of each location detecting units 8 and 9. For example, in case where IRs are emitted from a remote control transmitter far off from the location detecting units 8 and 9, the received signal size becomes small, the integral action time becomes long, and a long period of time is required to reach the prescribed reference value for the level of the integral signal, Therefore, the receiving sensitivities of the location detecting units 8 and 9, and the time information are in inverse proportion with each other.

The time information is the receiving sensitivity (a value which is variable according to the location (distance and angle) of an infrared signal source or a remote control transmitter) and the location of the remote control transmitter is accurately detected inversely from two time informations T1 and T2.

Figure 3:
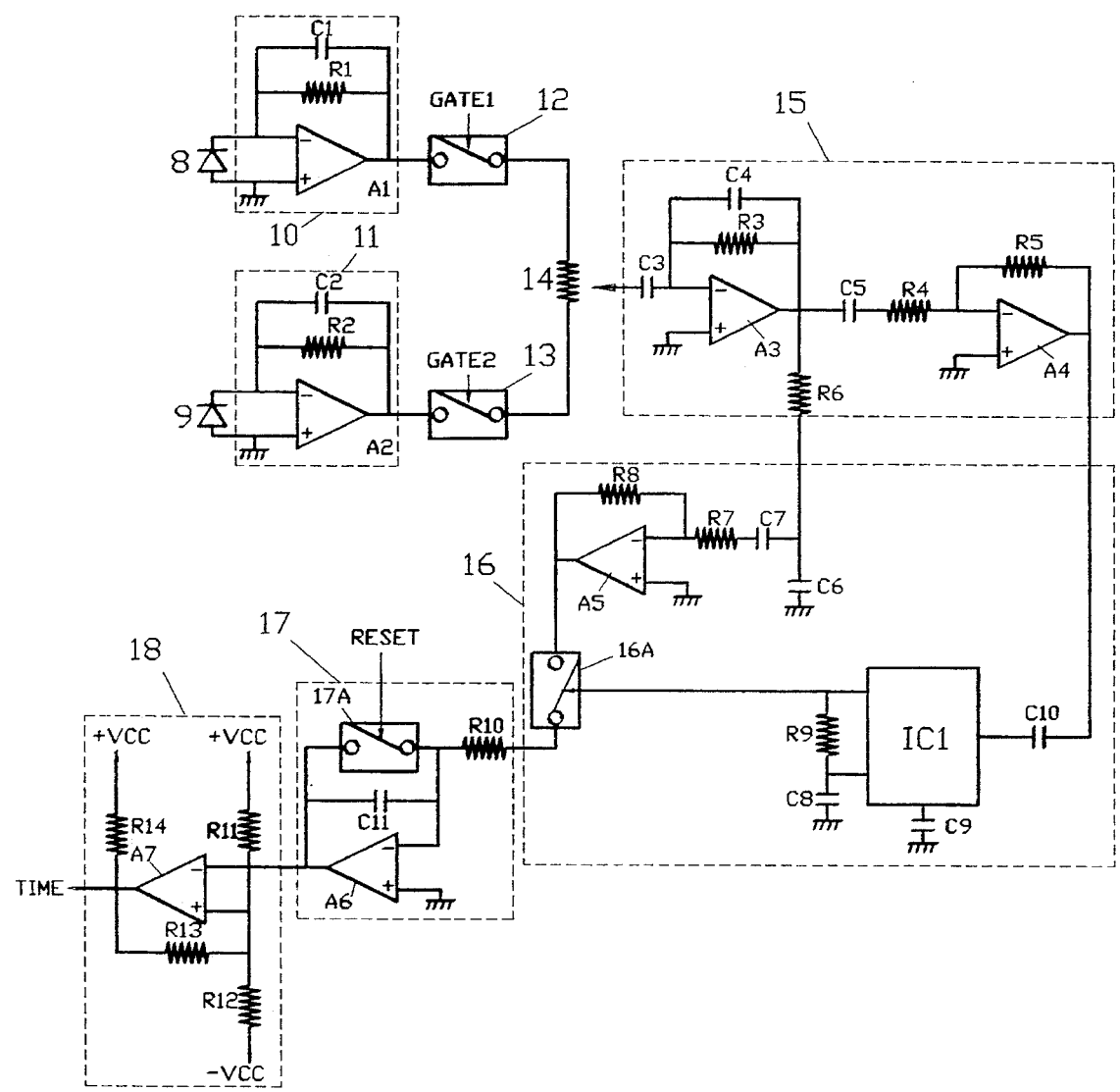
FIG. 3 is an exemplary circuit diagram of the apparatus for locating a remote control transmitter according to the present invention.

FIG. 3 shows an embodiment of the apparatus for locating remote control transmitter according to the present invention. The location detecting units 8 and 9 comprise infrared diodes, the amplifying circuit 10 comprises an operational amplifier A1, a resistor R1, and a condenser C1 for amplifying the input signal of the location detecting unit 8, the amplifying circuit 11 comprises an operational amplifier A2, a resistor R2, and a condenser C2 for amplifying the input signal of the location detecting unit 9, variable resistor 14, the main amplifier 15 comprises double operational amplifiers A3 and A4, three condensers C3, C4 and C5, and four resistors R3, R4, R5, and R6, the rectifying circuit 16 comprises an operational amplifier A5, two condensers C6 and C7, and two resistors R7 and R8 for rectifying the input signal into half wave, switch circuit 16A for supplying the half wave rectified signal to the integrating circuit 17, and a switching control circuit IC1 for turning on the switching circuit 16A during the time determined by a resistor R9 and two condensers C8 and C9, the integrating circuit 17 comprises an operational amplifier A6 for integrating the input signal, a resistor R10 and a condenser C11 for setting an integral time constant, and a switch circuit 17A for discharging the condenser C11 by the reset signal RESET, and the comparing circuit 18 comprises four resistors R11, R12, R13, and R14 for setting a comparison reference value and a comparator A7 for comparing the basic value with the input signal.

In this example, the infrared receiving signals input at the infrared diodes 8 and 9 are amplified by the respective operational amplifiers A1 and A2, and are input to the main amplifier 15 through the switch circuit 12 and 13, and the input signal to the main amplifier 15 is amplified by the operational amplifiers A3 and A4.

The signal output from the operational amplifier A3 is rectified into half wave by a half wave rectification circuit including two condensers C6 and C7, two resistors R7 and R8, and an operational amplifier A5, and is input to the switch circuit 16A.

The signal output from the operational amplifier A4 is input to the switching control circuit IC1, (PLL IC) which turns on the switch circuit 16A during a predetermined time by a resistor R9 and two condensers C8 and C9 of the IC1 according to the input signal. Therefore, the half wave rectified signal is input to the integrating circuit 17 during said predetermined time.

In said integrating circuit 17, a condenser C11 is discharged by turning on a switch circuit 17A at the time of input of RESET, and then the input half wave rectification signal is integrated by an operational amplifier A6 and a condenser C11. The integral time constant is determined by a condenser C11 and a resistor R10. In the operation of the integration, the output of the operational amplifier A6 is gradually increased and the signal is compared by the comparator A7.

The comparator A7 outputs a high signal when the level of the input signal is smaller than the reference value determined by two resistors R11 and R12, and outputs a low signal when the level is larger. Therefore, the signal becomes the time information TIME.

As described above, the present invention has the following effects:

1) Circuit is simple;
2) Cost reduction can be realized by locating the remote control transmitter accurately with a small number of location detecting units;
3) It is easy to install by excluding the conventional infrared guide; and
4) Simplicity of structure is realized because a separate analog-to-digital converter for the analysis of distance information from the remote control transmitter is not required.

Although the invention has been described in detail in the foregoing for the purpose of illustration, it is to be understood that such detail is solely for that purpose and that variations can be made therein by those skilled in the art without departing from the spirit and scope of the invention as described by the following claims.

What is claimed is:

1. An apparatus for locating a remote control transmitter detectable by said apparatus, comprising:
   two location detecting units, disposed in a prescribed direction with directivity to receive infrared signals from said remote control transmitter, wherein both of said two location detecting units receive the infrared signals from said remote control transmitter, regardless of a location of said remote control transmitter;
   two amplifying circuits for amplifying said infrared signals received at said two location detecting units;
   two switch circuits for outputting amplified signals from said two amplifying circuits during a prescribed time according to gate signals;
   means for adding signals output from said two switch circuits;
   a main amplifier for amplifying an added signal from said means for adding;
   a rectifying circuit for rectifying an amplified signal received from said main amplifier;
   an integrating circuit for integrating a rectified signal from said rectifying circuit and converting a signal strength received at said two location detecting units into time information; and
   a comparing circuit for comparing an integrated signal from said integrating circuit with a prescribed reference value and transforming the integrated signal into the time information corresponding to said signal strength received at said two location detecting units.

2. The apparatus of claim 1, wherein each of said two location detecting units includes at least one infrared diode.

3. The apparatus of claim 1, wherein each of said two amplifying circuits includes an operation amplifier, a resistor, and a condenser, in parallel, for amplifying said infrared signal received at said two location detecting unit.

4. The apparatus of claim 1, wherein said means for adding includes a plurality of variable resistors.

5. The apparatus of claim 1, wherein said main amplifier includes a plurality of double operational amplifiers, a plurality of condensers, and a plurality of resistors.

6. The apparatus of claim 1, wherein said rectifying circuit includes an amplifier, a plurality of condensers, a plurality of resistors, a switch for supplying a half wave rectified signal to said integrating circuit; and
   a switching control circuit for controlling said switch.

7. The apparatus of claim 1, wherein said integrating circuit includes an operational amplifier for integrating said rectified signal;
   a resistor and a condenser for setting an integral time constant; and
   a switch circuit for discharging said condenser by a reset signal.

8. The apparatus of claim 1, wherein said comparing circuit includes a plurality of resistors for setting said prescribed reference value; and
   a comparator for comparing said prescribed reference value with said integrated signal.

9. An apparatus for receiving a remote control transmitter detectable by said apparatus, comprising:
   first location detecting means, disposed at a first angle for receiving infrared signals from said remote control transmitter,
   second location detecting means, disposed at a second angle, different from said first angle for receiving the infrared signals from said remote control transmitter,
   wherein both said first location detecting means and said second location detecting means receive the infrared signals regardless of a location of said remote control transmitter; and
   wherein said first location detecting means outputs a high strength signal when the infrared signal is close to perpendicular to a detecting surface of said first location detecting means and said second location detection means outputs a low strength signal when the infrared signal is close to parallel to a detecting surface of said second location detecting means; and
   processing means for locating the remote control transmitter from the high strength signal from said first location detecting means and the low strength signal from said second location detection means, said processing means including
   first and second amplifying means for amplifying the high strength signal and the low strength signal, respectively,
   means for adding and amplifying an output of said first and second amplifying means
   rectifying means for rectifying an output of said means for adding and amplifying, and
   integrating means for integrating an output of said rectifying means.

10. The apparatus of claim 9, wherein each of said first and second location detecting means includes at least one infrared diode.

11. The apparatus of claim 9, wherein each of said first and second amplifying means includes an operation amplifier, a resistor, and a condenser, in parallel.

12. The apparatus of claim 9, further comprising:
   comparing means for setting a prescribed reference value and for comparing said prescribed reference value with an output of said integrating means.

* * * * *